United States Patent [19]

Nakama et al.

[11] Patent Number: 4,526,333
[45] Date of Patent: Jul. 2, 1985

[54] HOLDING DEVICE

[75] Inventors: Daiji Nakama, Chigasaki; Shigeru Kimura, Kamakura, both of Japan

[73] Assignee: Nifco Inc., Yokohama, Japan

[21] Appl. No.: 455,631

[22] Filed: Jan. 5, 1983

[30] Foreign Application Priority Data

Jan. 11, 1982 [JP] Japan .............................. 57-1222[U]

[51] Int. Cl.³ .............................................. F16L 3/08
[52] U.S. Cl. .................................... 248/73; 248/74.2; 248/229; 248/316.1
[58] Field of Search ........................ 248/73, 74.1, 74.2, 248/74.5, 316.1, 316.7, 316.8, 229; 339/91 R, 126 R

[56] References Cited

U.S. PATENT DOCUMENTS

| | | | |
|---|---|---|---|
| 2,819,858 | 1/1958 | Mittendorf | 248/73 |
| 3,149,808 | 9/1964 | Weckesser | 248/74.5 |
| 3,467,942 | 9/1969 | Dell et al. | 339/91 R |
| 3,765,633 | 10/1973 | Caudill | 248/229 |
| 3,917,202 | 11/1975 | Reinwall et al. | 248/73 |
| 4,121,798 | 10/1978 | Schumacher et al. | 248/229 |
| 4,407,556 | 10/1983 | Hoschett | 339/91 R |

Primary Examiner—William H. Schultz
Assistant Examiner—Ramon O. Ramirez
Attorney, Agent, or Firm—J. R. Halvorsen; T. W. Buckman

[57] ABSTRACT

Disclosed is a device for holding a linear article on a support body, consisting of a pair of plastic counterparts each comprising a base, an article holding means integrally provided on the upper surface of the base, a notched rod integrally provided on the upper surface of the base and extending outward from one front corner of the base, a guide channel having a catch projection therein and extending inward from the other front corner of the base, and an engaging leg integrally provided on the undersurface of the base. In use a pair of plastic counterparts are engaged with each other by inserting the notched rod of each counterpart into the guide channel of the other counterparts, and the counterparts thus engaged are placed across the width of a support plate with the legs of the counterparts abutting the opposite edges of the support plate. The combined counterparts may also be placed across an opening of a support plate with the legs in the opening, with the holding device being fixed to the support by bringing the counterparts closer to each other in the former instance until their legs have engaged the opposite edges of the width or away from each other in the latter instance so the legs engage opposite edges of the opening, thus fixing the holder to the support firmly irrespective of the width of the support or the size of the hole therein.

14 Claims, 11 Drawing Figures

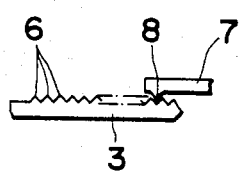
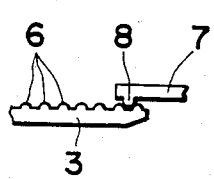
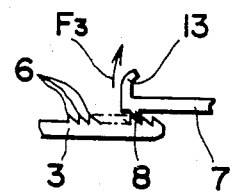
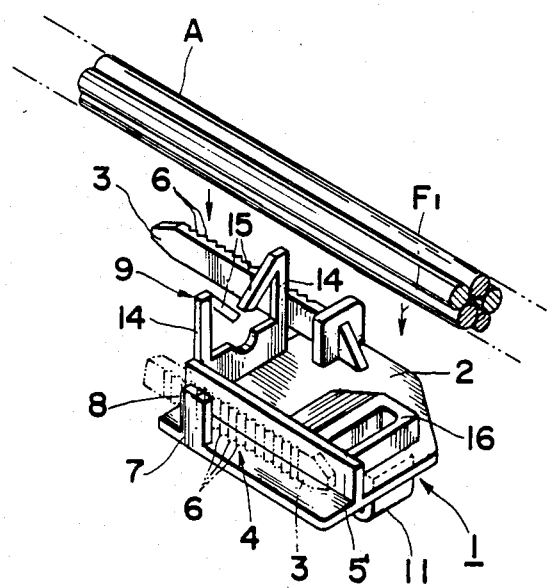

HOLDING DEVICE

BACKGROUND OF THE INVENTION

This invention relates to a plastic holder for fixing a linear article such as a rod, pipe or wire to a support body.

A conventional holder for use in fixing such a linear article to a support body comprises means for holding the linear article at one side, and means for snap-fastening the holder itself into an opening of the support body at the other side. The conventional holder has been widely used because of the ease with which it can be fastened to a support body. Such a holder, however, cannot grip the support body with a sufficiently strong force, and therefore, it is easily removed when an undesired external force is applied. In order to ensure the firm setting of a holder on a support body it is necessary to make in the support body a hole of the exact size needed to assure the tight fit of the snap fastener of the device. This requires precise holing in the support body, and if the hole is somewhat larger or smaller than the required precise dimensions, the support body cannot be used and is wasted. It is apparent that this strictness in the making of the holes in the support bodies requires care, and that support bodies easily tended to be wasted.

SUMMARY OF THE INVENTION

The object of this invention is to provide a device for holding a linear article such as a rod, pipe or wire and assuring the firm setting thereof on a support body irrespective of the size and contour of a setting portion of the support body.

To attain this object a holder device according to this invention consists of a pair of plastic counterparts each comprising a base, an article holding means integrally provided on the upper surface of the base, a notched rod integrally provided on the upper surface of the base and extending outward from one front corner of the base, a guide channel having a catch projection therein and extending inward from the other front corner of the base, and an engaging leg integrally provided on the under surface of the base. In use the pair of plastic counterparts are engaged with each other by inserting the notched rod of one counterpart into the guide channel of the other counterpart, and the counterparts thus preliminarily engaged are placed in position across the width of a support plate with the engaging legs abutting the edges of the support plate. The combined counterparts may also be positioned across an opening of a support body with the engaging legs placed in the opening. The holding device is then fixed to the support body by bringing the counterparts closer to each other in the former case, until the legs have engaged the edges of the support plate, or further away from each other in the latter case until the legs have engaged the edges of the opening of the support plate, thus firmly setting the holder on the support irrespective of the width or size of the opening of the support.

Other objects and advantages of this invention will be better understood from the following description which is made with reference to the accompanying drawings.

BRIEF EXPLANATION OF THE DRAWINGS

FIGS. 5(A)–5(C) show different shapes of the notches of a male rod and an allied catch projection.

FIG. 6 is a perspective view of one counterpart of a second embodiment.

DESCRIPTION OF PREFERRED EMBODIMENTS

Figure 1:
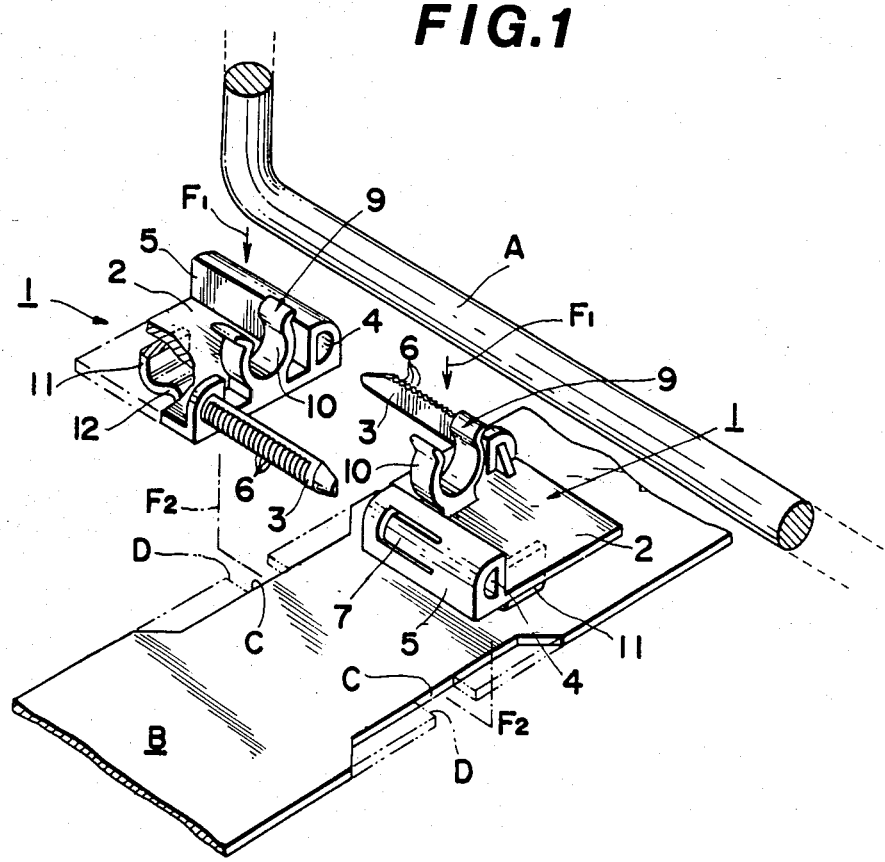
FIG. 1 shows a perspective view of a first embodiment of this invention with a pair of counterparts disengaged from each other.

A holding device according to this invention is advantageously used to detachably hold, for instance, an automobile jack by its handle on a stationary support plate. Usually, such a jack handle is kept in the trunk of an automobile where it occupies considerable space, which otherwise could be used to store other things. Therefore, it is desirable to have the jack handle held onto a battery-retaining stay in the engine compartment. A holding device according to this invention accomplishes this. It, however, should not be considered that such an application limits the invention, as a holder according to this invention may be used to hold various things other than a jack handle in various locations. The holder, also, can be fixed to a rod or pipe rather than to a flat plate. In fixing a holder to a stationary plate the holder is fixed across the width of the plate with its engaging legs catching the opposite edges of the plate. Also, it may be fixed across an opening of the plate with its engaging legs catching the opposite edges of the opening. In fixing it to an elongated support body such as a round rod, it fixes to the support body with its engaging legs across the diameter of the body. Thus a holder according to this invention can be fixed to a support by making use of any opposed sides or edges possessed by the support.

Referring to FIGS. 1 to 4, there is shown a first embodiment according to this invention fixed to a flat plate "B", specifically a battery retaining stay in the engine compartment of an automobile and holding an automobile jack handle "A". As seen in the drawing the holder is fixed across the plate between the opposite edges "C" of the plate.

As shown, the holder comprises a pair of mutualfacing symmetrical counterparts to be engaged with each other. These counterparts are of a molded plastic. Each counterpart can be made in a molded with a single molding.

Each plastic counterpart comprises a rectangular base 2, a rod 3 projecting from a front corner of the rectangular plate and a rod guide channel 4 disposed along a side of the rectangular base in opposition to the rod 3. The rod guide channel 4 of each counterpart is adapted to receive the rod 3 of the other counterpart in preliminary engagement as described below (See FIG. 2). In this connection the rod 3 and the rod guide channel 4 of each counterpart are positioned in an opposing symmetrical relationship with respect to the other counterpart. In this particular embodiment the rod guide channel 4 is formed in the channel housing 5. A series of notches or teeth 6 are formed on at least are longitudinal side, that is, outer side in this particular embodiment, of the rod. As shown, each tooth is in the form of slope head-and-erect tail like sawtooth.

A bendable tongue 7 is provided at one side of the guide channel 4 by slitting the side of the guide channel into the form of cantilever, and the bendable tongue 7 has a single sawtooth 8 complementary in shape to those of the rod 3, that is, erect head-and-slope tail tooth formed on its inside longitudinal surface.

The base plate, also, has an article snap-in retainer 9 of a shape appropriate for retaining an article "A" to be held. For example, in fixing an automobile-jack handle, the retainer 9 is shaped in the form of an open loop so that the jack handle snaps into the circular space of the catch. Therefore, the circular space of the article catch has the same diameter as the jack handle, but the open portion 10 of the retainer is somewhat smaller than the diameter of the jack handle thus preventing the slipping-out of the handle, but while being yieldingly deformable to allow the release of the handle when pulled.

The base plate has an engaging leg 11 projecting from its undersurface, and when a pair of counterparts are engaged with each other and are put across an associated support, the legs of these counterparts engage the opposite edges of the support plate. In this particular embodiment each leg is bent upward, and the ends 12 are thereof bent slightly downward, thus permitting the counterpart to firmly clip onto the support.

Figure 2:
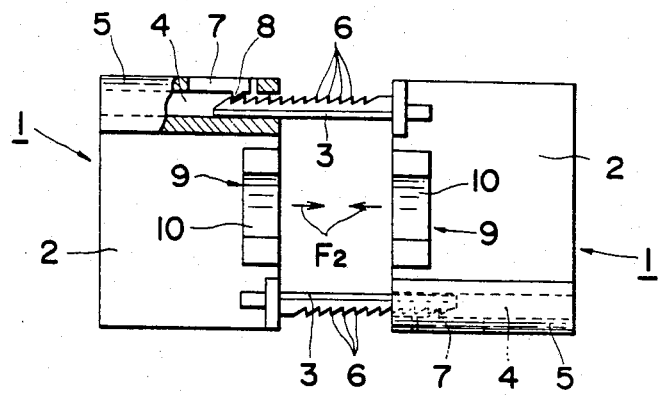
FIG. 2 shows a partly broken plane view of the counterparts preliminarily engaged with each other.
Figure 3:
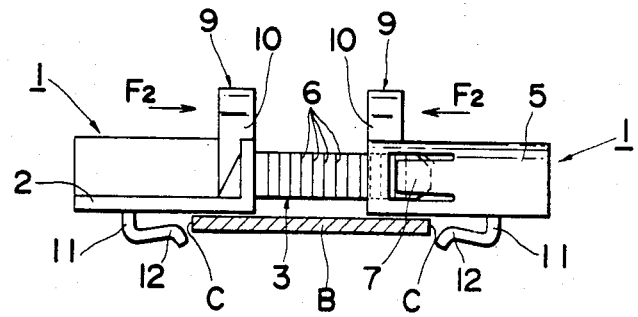
FIG. 3 is a side view of the preliminarily engaged counterparts.
Figure 4:
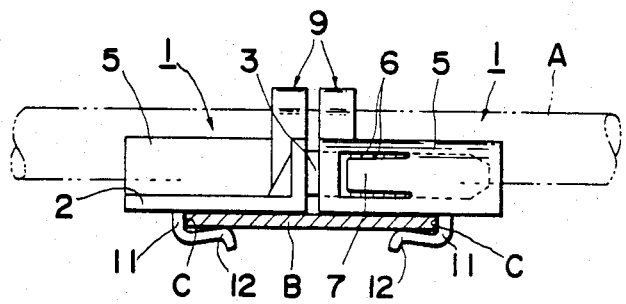
FIG. 4 is a similar side view, but showing the position in which the counterparts are firmly fixed to an underlying support plate.

The manner of fixing a pair of counterparts to a support plate "B" is described below:

A pair of counterparts 1 are positioned opposite each other, and then the rod 3 of one counterpart is inserted slightly into the guide channel 4 of the other counterpart so that the top part of the sawtoothed rod of each counterpart is brought into engagement with the catch projection of the guide channel of the other counterpart, as shown in FIGS. 2 and 3. When the rods 3 are pushed into allied guide channels 5, their resilient tongues 7 are yieldingly and intermittently bent, causing the sawtooth of each tongue 7 to engage and release the sawteeth 6 of the rod 3 one after another, thus allowing each rod 3 to advance gradually into the guide channel 4 similarly to the operation of a pawl and ratchet mechanism.

In the preliminary engagement of the counterparts they are spaced apart from each other, leaving an inter-leg distance somewhat greater than the crosswise dimension or width of a support plate on which the holding device is to be fixed, as shown in FIG. 3.

The preliminary-engaged counterparts are put on the support plate with their legs 11 in the vicinity of the opposite longitudinal sides "C" of the support plate "B", and the counterparts are then pushed towards each other as indicated by arrows "$F_2$" (FIG. 2), causing each rod 3 to advance gradually into the corresponding channel housing 5 through the catch-and-release ratchet action until the legs 11 have engaged firmly with the edges "C" of the support plate "B". The holding device is thereby fixed positively to the support plate "B", and it is ready to retain detachably an article "A" as described above.

Once a holder has been fixed to a support plate, the sawtooth 8 of the tongue 7 of each channel housing 5 is engaged with one of the sawteeth of the rod 3 in the guide channel 4 in such a way that the rod 3 cannot disengage from the guide channel 4, thus preventing the separation of the counterparts from each other. The holder, also, engages firmly with the support plate by the clamping of the plate between the bent portion of the legs 11 and the undersurface of the base 2 of each counterpart.

With a view to permitting the detachable mounting of a holder on an associated support plate, while preventing the undesired release of the holder from the support due to external vibration or force, the catch projection of the tongue 7 and the notches 6 of the rod 3 may be triangular (FIG. 5(A)) or semi-circular in shape (FIG. 5(B)). The counterparts will then be disengaged and separated from each other when pulled in opposite directions, disassembling the holder and removing it from the support plate. In case of one-way clutch type catch and notch projections described above, a thumb piece 13 may be integrally provided at the free end of the tongue 7 as shown in FIG. 5(C). A holder can then be easily disassembled and removed from a support simply by pushing upward the thumb piece 13 of the tongue as indicated by arrow "$F_3$" and pulling the counterparts apart. When it is desired that a holder be fixed at a selected position of an elongated support plate, it suffices for a recess "D" to be provided on each longitudinal side of the support plate at the required position where the holder is to be fixed, as shown by the imaginary lines in FIG. 1, the holder then being fixed across the reduced width of the support plate.

Referring to FIG. 6, there is shown a second embodiment according to this invention. In FIG. 6 the same reference numerals as used in FIGS. 1-5 are used to indicate the same parts as appear in the first embodiment. In this particular embodiment a guide channel 4 is defined by a wall 5' and a resilient tongue 7 both integrally connected to and rising from the upper surface of a base 2. The resilient tongue 7 has a catch projection 8 on the inner surface thereof. It should be noted that the tongue 7 can be omitted and a catch projection be integrally connected to the outer surface of the elongated wall, provided that the notched rod has sufficient resilient strength and stiffness to permit the required ratchet action. This is the same with the first embodiment and a third embodiment which will be described later. As with the first embodiment a tongue can be omitted, in which case a catch projection is provided on the inner surface of the longitudinal hole of the guide channel. Again in the second embodiment notches may be provided along the inner side of a rod 3 or on both sides thereof. An article clamping stand is shown as clamping a bundle of wires "A" or other linear bodies.

Specifically, this article clamp is composed of a pair of erect poles 14, each having an inward-and-downward slanted extension 15. When a bundle of wires are put on the slanted extensions of the clamp stand, they are yieldingly bent and deformed, thus allowing the bundle of wires to enter the space defined by the poles 14 and slant extensions 15 of the clamp stand. Once the bundle of wires "A" have been put in the clamping space, the slant extensions 15 prevent the bundle of wires from slipping out. A pillow block 16 is integrally connected to the upper surface of the base to hold the bundle of wires and straight horizontal.

Figure 7:
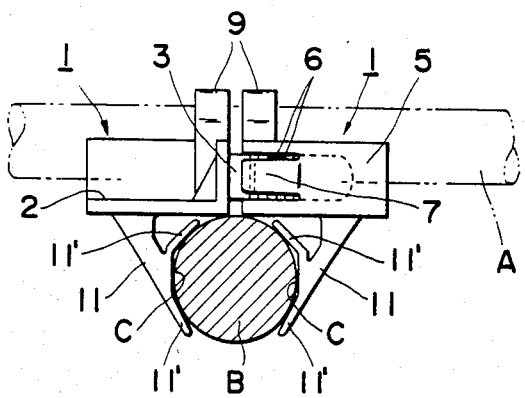
FIG. 7 is a side view of a third embodiment.

Referring to FIG. 7, there is shown a third modification of this invention which is suitable for fixing the holder to an elongated support body "B" rather than a flat plate. The legs are modified so as to clamp onto the diametrically opposite sides or edges "C" of an elongated support body "B". Specifically, the legs 11 of the counterparts are shaped into the same form as a pair of hands holding a cylindrical article with the thumbs and fingers positioned around the cylindrical body as indicated at 11'.

With this arrangement holders can be used to build a grid or lattice structure simply by making their upper clamp and lower legs catch and hold a plurality of rods or pipes.

The embodiments described above are adapted to sandwich a support body "B" in between two opposing counterparts with the legs 11 thereof abutting the sides or edges "C" of the support body. It is, however, possible for the legs of the counterparts to support the holder body in other ways such as shown in FIGS. 8 and 9.

Figure 8:
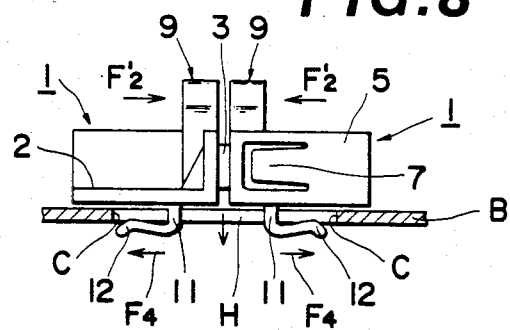
FIG. 8 is a side view of a fourth embodiment in which the counterparts are in the preliminarily engaged position.
Figure 9:
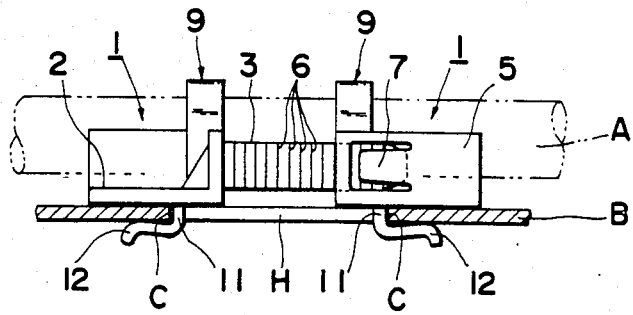
FIG. 9 is also a side view of the fourth embodiment, with the holder being firmly fixed to a support body.

In FIGS. 8 and 9 is shown a third embodiment according to this invention. This embodiment is different from the first embodiment in that each counterpart has its engaging leg closer to the front of the counterpart than in the first embodiment, and that the engaging leg faces outward at 12 opposite to the first embodiment.

In use, a pair of counterparts are engaged by the insertion of the rod of each counterpart into the guide channel of the other counterpart, and then the counterparts are brought almost into contact with each other as shown in FIG. 8. The counterparts are then put on a support plate "B" with their engaging legs in an opening "H" of the support plate. The counterparts are separated from each other in the direction as indicated by arrows "F4" until the legs 11 have been pushed against the opposite edges "C" of the opening "H". Thus, the holding device is fixed to the support plate "B" by the legs thereof extending to the full diameter of the opening in the support plate. In this particular embodiment the rod of each counterpart must be moved in the guide channel formed in the channel housing of the other counterpart in the mutually opposite direction, and therefore each rod is provided with two-way notches as shown in FIGS. 5(A) and 5(B).

The movable adjustment of two nested counterparts according to this invention advantageously permits a sizeable allowance in preparing a selected part of a support body to which the holder is to be fixed. Specifically, less strictness is required for cross-dimensions such as the width of the recessed part of a support plate as indicated at "C" in FIG. 1, or the diameter across the hole of a support plate as indicated at "H" in FIGS. 8 and 9. This feature increases the versatility of the holder in applications. Counterparts may advantageously be made by plastic-molding with a single mold. If it is assumed that a conventional snap fastener type holder is fixed to a resin-coated support plate as is the case with the first embodiment where fixing is to a battery supporting plate in the engine compartment of an automobile. The thickness of the resin coating tends to vary with the stress involved, and therefore the snap-fastener type holder cannot be designed to produce a sufficiently strong hold on the support plate at all times because of the unknown factor of varying coating thickness. Thus, disadvantageously the conventional holder tends to detach from coated support bodies. In contrast to this, as movable adjustment of the counterparts is possible in accordance with the particular crosswise dimensions of support bodies, a holding device according to this invention is unaffected by the varying thickness of the coated-support plate, permitting the application of sufficient force to hold itself firmly on the support body at all times.

What is claimed is:

1. A holding device consisting of a pair of identical one-piece integral plastic counterparts, each comprising:
   a base including front and side edges,
   a holding means provided on the upper surface of said base for holding an elongated article substantially parallel to said base,
   a rod is provided extending in parallel spaced relation to said upper surface of said base along one side edge, said rod having a substantial portion thereof extending outwardly beyond said front edge of said base, said extending portion including a plurality of ratchet notches,
   a guide channel provided along the other side edge of said base and having an open end facing said front edge for complementary acceptance of said rod of a mating counterpart, each said guide channel having its inner surface provided with a catch projection of a shape complementary to the shape of the notches of said rod of the matching counterpart for sequential engagement of at least one of said notches,
   and front edge, rod and guide channel of each counterpart being arranged so as to face said front edge and respective guide channel and rod of the mating counterpart, and
   an engaging leg projected downwardly from the undersurface of said base,
   whereby the engaging legs of the pair of counterparts firmly clamp opposite edges of a support member by adjusting the length of the rods inserted into the guide channels so as to conform said engaging legs to the spacing size of the said edges of said support member and the holding means of the pair of counterparts being adapted to grip the elongated article at spaced points thereon.

2. A holding device according to claim 16 wherein said guide channel is defined by a longitudinal bore through a channel housing integrally connected to the upper surface of said base and said catch projection is integrally connected to the inner surface of said hole.

3. A holding device according to claim 16 wherein said guide channel is defined by the space between opposing walls integrally connected to the upper surface of said base, and said catch projection is integrally provided on the inside of one of said walls.

4. A holding device according to claim 2 wherein said guide channel has a tongue cut therein, and said catch projection is integrally provided on the free end of said tongue.

5. A holding device according to claim 1 wherein said base has an engaging leg integrally connected to the undersurface of the base, said leg of each counterpart being bent forward toward said front edge so that the legs of said counterparts clamp said support member thereacross when said counterparts are brought close to each other.

6. A holding device according to claim 16 wherein said base has an engaging leg integrally provided on the undersurface of the base, said leg of each counterpart being bent rearward so that the legs of said counterparts engage with the opposite edges of an opening in a support plate by drawing said couterparts away from each other.

7. A holding device according to claim 1 wherein said base has an engaging leg integrally provided on the undersurface of the base, said leg being crescent in shape so that the legs of said counterparts encircle and embrace said support member which is rod-like in configuration when said counterparts are brought close to each other.

8. A holding device according to claim 16 wherein the notches of said rod and said catch projection are semicircular.

9. A holding device according to claim 16 wherein the notches of said rod and said catch projection are triangular.

10. A holding device according to claim 6 wherein the notches of said rod and said catch projection are semicircular.

11. A holding device according to claim 6 wherein the notches of said rod and said catch projection are triangular.

12. A holding device according to claim 16 wherein the notches of said rod and said catch projection are of counter-sawtooth shape.

13. A holding device according to claim 5 wherein the notches of said rod and said catch projection are of counter-sawtooth shape.

14. A holding device according to claim 7 wherein the notches of said rod and said catch projection are of counter-sawtooth shape.

* * * * *